Dec. 15, 1936. C. A. UPSON 2,063,964
CONSTRUCTION MATERIAL
Filed July 7, 1932
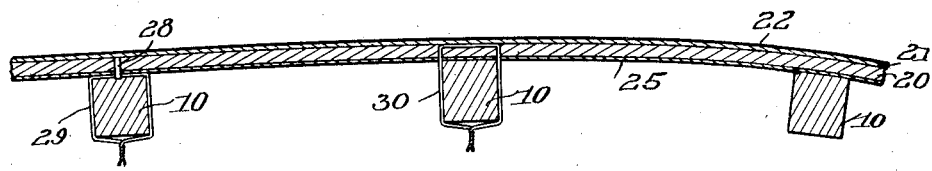
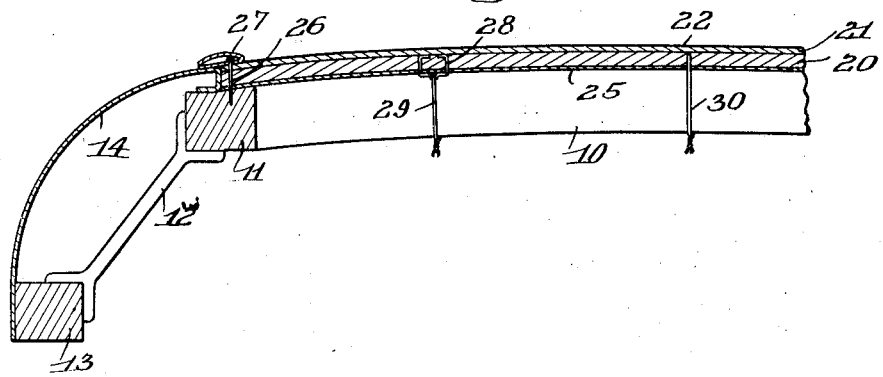
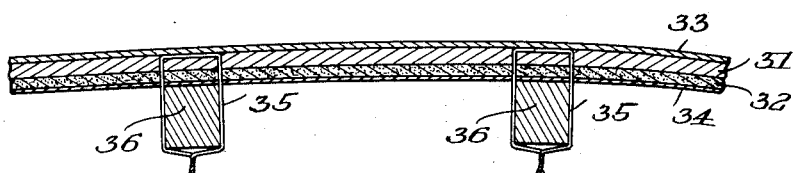
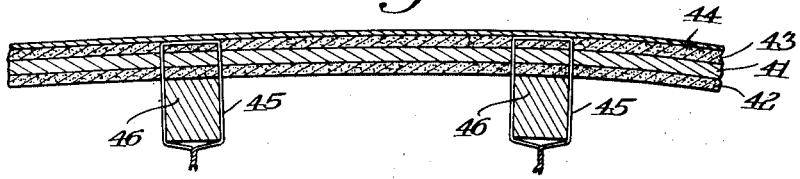
INVENTOR
Charles A. Upson
BY Edward H. Cumpston
his ATTORNEY Patented Dec. 15, 1936

2,063,964

UNITED STATES PATENT OFFICE 2,063,964

CONSTRUCTION MATERIAL

Charles A. Upson, Lockport, N. Y., assignor to The Upson Company, Lockport, N. Y., a corporation of New York Application July 7, 1932, Serial No. 621,195

15 Claims. (Cl. 154—44)

This invention relates to construction material, and an important object of the invention is the provision of a simple and satisfactory material which, while capable of many uses, is especially adapted for and useful in the manufacture of automobile tops and the like.

Another object of the invention is to provide a substantially completed, cut-to-size, ready-to-apply panel or member which may be attached quickly and easily to the frame of an automobile body in order to form the auto top.

Still another object is the provision of a construction material having a substantial degree of sound deadening or insulation, preferably together with a substantial degree of thermal insulation, so that when such material is used, for example, to form an automobile top, the noise ordinarily arising from the top will be eliminated or substantially reduced, and the vehicle will also be warmer in winter and cooler in summer than if the thermal insulation feature were not present in the top.

A further object is the provision of a construction material satisfactory for the uses above mentioned, which is so designed that it may be manufactured economically and quickly with relatively simple machinery, by manufacturing methods adapted to mass production.

To these and other ends the invention resides in certain improvements and combinations of parts, all as will be hereinafter more fully described, the novel features being pointed out in the claims at the end of the specification.

This application is a continuation in part of my application for patent on Building material, Serial No. 473,794, filed August 8, 1930 (Case 72), and also a continuation in part of my application for patent on Composite construction material, Serial No. 525,792, filed March 27, 1931 (Case 73).

In the drawing:

Fig. 1 is a longitudinal vertical section through a fragment of an automobile top constructed in accordance with one embodiment of the present invention;

Fig. 2 is a transverse vertical section through the same;

Fig. 3 is a longitudinal vertical section similar to Fig. 1, illustrating another embodiment of the invention, and Fig. 4 is a similar view illustrating a third embodiment of the invention.

The same reference numerals throughout the several views indicate the same parts.

This invention has to do with building material, various forms of which are capable of various uses, such as sheathing, linoleum underlay, and the like, but it is particularly adapted and useful for the construction of the tops or roofs of automobiles and accordingly the invention will be disclosed in this present application in connection with its use in automobile tops, by way of example.

The present invention contemplates radical and important changes in the construction of automobile tops as now customarily carried out. Ordinarily, automobile tops are constructed by building them up layer by layer at the automobile assembly plant. For example, in one method commonly used in the art, wire netting is first spread on the frame or ribs which support the top, then padding is placed over this netting, then a layer of felt is placed over the padding and netting, then fabric is spread over the felt, and finally the waterproof layer is placed on the structure. All of these operations require a considerable amount of time and labor, and are often unsatisfactory for one reason or another.

The present invention, on the contrary, provides a previously assembled or pre-formed top panel ready to be applied to the automobile frame as a unit in a single operation. It is contemplated that the factory manufacturing the top panels will ship the completed panels to the automobile assembly plant in such form that substantially nothing need be done at the assembly plant except cutting the panel to the proper size if this has not already been done, placing the panel on the frame, and fastening it thereto. Preferably, the panels will even be cut to the proper size by the manufacturer, but if desired, the automobile assembly plant may obtain the panel material in larger sizes and cut it down to the desired individual panel sizes as required.

The top panel may be made of various forms, but it is desired in each case to have it so designed that it may be constructed rapidly and economically by relatively simple machinery, and preferably in a continuous manner adapted to mass production. Panels of one form may be used for automobile tops on the cheaper automobiles, while panels of a somewhat more refined, but also more expensive form may be used on higher priced automobiles if desired.

One satisfactory form of relatively inexpensive top panel, for use where cost is an important consideration, is illustrated by way of example in Figs. 1 and 2 of the drawing. Here, the top frame members or ribs extending transversely across the automobile top are illustrated at 10, and are connected at their ends to longitudinal members 11 supported by brackets 12 or other suitable means from longitudinal members 13 at the sides of the automobile. A curved member 14, usually of metal, extends along the junction of the top and the side of the vehicle so that the top proper need not extend all the way to the edges but can be confined to those portions of the roof which have relatively easy curvatures.

The top panel of the present invention includes a relatively strong and rigid structural member 20 having sufficient strength and rigidity to span the spaces between the ribs or frame members and to support substantial weights which might be placed on the vehicle top, yet it is capable of being bent to conform to easy curves in two directions, such as the curvatures customarily found in automobile tops, which may be conveniently referred to as double curvatures.

In addition to having these characteristics, it is also advisable, when cheapness and simplicity are important features, that the structural member itself should have some substantial degree of sound deadening and heat insulating value. For this purpose, it is found that a structural member of fibrous material may be used, and especially one which is of relatively porous texture such for example as the material made from straw fibers or the like and currently obtainable on the market under the trade name "Upson Insulating Board". This material, and other similar materials, are of a light and porous nature having substantial heat and sound insulating values, and when used in panels of ⅜ to ½ inch thick, for example, the material can be bent to conform to the necessary curvature and yet has the required strength and rigidity to stand up in service and to support any normal weight which may be placed on the roof.

Over the top of the structural member 20 is a layer or facing of weather-resisting material which is waterproof or substantially impervious to water. The facing layer may be made in a number of ways, but as one satisfactory form of construction there is illustrated in Figs. 1 and 2, a layer 21 of felt paper or the like which is impregnated with a waterproof compound. This compound may be, for example, asphaltum, which is preferred in the present instance, or the felt may be impregnated with nitro-cellulose or other suitable waterproofing material. The facing layer 21 is preferably permanently applied to the structural member 20 in the initial manufacture of the product, preferably by cementing them together throughout substantially their entire area, so that the structural member 20 and facing layer 21 are assembled together as a unit ready for integral application to the automobile top frame.

If the felt 21 is impregnated with asphaltum or other material which has some tendency to "bleed" or ooze from the surface in hot weather, it is desirable to provide a non-bleeding coating over the felt, as indicated at 22. This non-bleeding coating may be a layer of any material which is substantially impervious to the asphaltum or other material with which the felt is impregnated. Certain kinds of shellac, varnish, pyroxylene, or the like when applied to the top of the felt will form a satisfactory non-bleeding coating for asphaltum and similar materials. This non-bleeding coating may in itself form the top decoration of the structure, or it may be simply a base on which lacquer, paint, rubber composition, or other decoration may be placed.

The porous fibrous panel 20 which constitutes the preferred form of structural member in the inexpensive construction shown in Figs. 1 and 2, has a relatively rough and porous surface. In some instances, as when the construction is used on truck bodies, the under side of the top may be exposed to view and it may be desired at times to have the visible surface smoother than that of the structural member 20 itself. In such instances, it is contemplated that a sheet 25 of smooth material may be placed on the under side of the structural member 20, to present to view a surface which is smooth and one which is capable of being painted or otherwise decorated. This sheet 25 may be of any suitable material having the desired texture, such as a sheet of smooth paper or a layer of cloth or thin metal or wood. The layer 25, like the layer 21, is preferably permanently affixed by adhesive or the like to the structural member 20 when the material is being manufactured, so that the automobile top constitutes only a single piece ready for application to the frame.

Any suitable means may be provided for securing the top to the frame. The edges of the top may be nailed to the frame member 11 by nails 26, the nail heads being covered by a turned down molding 27.

At points inwardly of the edges of the material, it is preferably held to the frame members 10 by what may be termed blind fastening means which does not perforate the waterproof facing layer 21. As one possible form of such means, staples 28 may extend through and be secured to the structural member 20, but not through the waterproof layer 21, as shown in Fig. 2, and these staples may be accessible from beneath the material so that tying means such as the wires or cords 29 may be passed through the staples and tied around the frame members 10. As another possible form of blind fastening, there is shown ligature means 30 in the form of a wire or heavy cord which is anchored to the top by extending through the structural member 20 but not through the waterproof layer 21, and is fastened around the rib or frame member 10.

The specific method of fastening the top to the frame forms no part of the present invention, but is disclosed in greater detail and claimed in the copending patent application of Ross Winship for Fastening means for building material, Serial No. 621,194, filed July 7, 1932 (Case 93), now Patent No. 2,016,566, granted October 8, 1935.

It is contemplated that the layers 20 and 21, together with the layer 25 if it is used, will be permanently assembled at the factory making this material, and the staples 28 or ligatures 30 or other suitable fastening means will be placed in the material at the time of its manufacture. Then when this completed material arrives at the automobile assembly plant, it is a relatively simple matter to apply the material as a single unitary piece to the frame of the automobile, to attach it to the frame by the blind fastening means already provided on the material, and to nail down the edges as shown if they are to be fastened in this way. This is radically different from and saves much time and labor in comparison to the present customary method of building up the automobile top structure layer by layer upon the frame, which is an awkward and time consuming operation.

In higher priced vehicles, where cost of each item is not such an important factor, the automobile top can be made of different materials, or a greater number of materials, or both, in order to secure greater sound deadening and thermal insulating efficiency. A satisfactory form of material which is more efficient but somewhat more expensive than the simple form shown in Figs. 1 and 2, is illustrated in Fig. 3. Here, the structural member is shown at 31, and beneath it is a layer 32 of insulating material. When a separate layer of insulating material is employed, as here, it is not necessary to rely wholly upon the structural member itself for the acoustic and thermal insulating effects, and thus a somewhat greater choice of material for the structural member 31 is available.

The structural member 31 may be of the same porous fibrous material constituting the structural member 20 of the cheaper form, or it may be of any other suitable material having the requisite characteristics of strength, rigidity, and ability to conform to the curvatures customary in automobile tops. For example, in addition to the above mentioned porous fibrous insulating board, it may be made of hard fiber board such as the laminated wallboard currently obtainable on the market under the trade name of "Upson Blue Center Board", or it may be made of wood veneer, a sheet of metal, or other suitable material. It is preferred and generally more satisfactory, however, to use fibrous material such as the laminated fiber wallboard above specifically mentioned.

The insulating layer 32 may be of any suitable material having the requisite degree of sound absorption and thermal insulation, but it is preferred to use felt for this purpose. Whenever the word felt is used throughout this specification and in the claims without other qualification, it is meant to include both the variety commonly known as wool felt or hair felt, and the variety commonly known as paper felt or felt paper. Either the wool felt or paper felt is satisfactory for the purposes of the present invention, the wool felt ordinarily being somewhat more efficient as insulating material, but also being of somewhat greater cost, so that the choice as between wool felt and paper felt will depend to some extent on the desired degree of insulation and the necessary restrictions as to price. If paper felt or felt paper is used, it is preferred to employ a relatively thick or bulky sheet of it.

In a construction of this kind it is found that the greatest insulating efficiency (both thermal and acoustical) is obtained when the material is composed of two or more layers having different specific gravities, different periods of natural vibration, and different coefficients of thermal and acoustical conductivity. The reasons why these characteristics increase the efficiency of the product are not yet fully understood, but it seems probable that when the layers are different in these respects, each one will tend to damp vibrations in the other to a much greater extent than if all the material were of the same charactertics. Furthermore, the different character of the layers probably causes at least some degree of reflection at the boundary surface between two adjacent layers. Also, when vibration is the result of outside or extraneous air waves, the layer which is first set into vibration can not impart as much of the impulse to the next layer of different specific gravity, as it could if the contacting layer were of the same specific gravity.

This desirable condition of different characteristics in the different layers, is well fulfilled when the material is constructed in the preferred manner above described, using a relatively strong and rigid fiber board as the structural member, in combination with a layer of lighter and softer material such as felt or the like, and together with, preferably, a water impervious layer of still different characteristics, as mentioned below.

Unless the structural member 31 is itself impervious to water, it is provided on its top with a weather-resisting, water-impervious facing 33 of any suitable form. For example, this facing may be in the nature of a rubberized textile fabric, which forms a suitable facing and which, furthermore, is of different specific gravity, natural period of vibration, and conductivity, from the other layers. The facing is preferably thoroughly cemented to the structural member 31 over substantially its entire area. It is found that when the facing is thus cemented, it will wear much better and longer than if it is connected to the member 31 loosely or at spaced points.

If the top is to be exposed from the interior of the body, as in the case of truck bodies or the like, a layer 34 of smooth material may be placed beneath the layer 32 of sound absorbing material to enhance the appearance, the layer 34 being preferably of smooth paper or cloth, as in the case of the layer 25 in Figs. 1 and 2.

This composite construction material is preferably built up at the factory to form an integral unitary assembly, as explained in connection with the material shown in Figs. 1 and 2, and is applied to the automobile top as a unit in a single operation. Preferably suitable blind fastening means, such as the wires or cords 35, are included in the material when it is constructed, so that the material may be fastened to the ribs or frame, without puncturing the top layer, by securing the fastening means 35 around the ribs.

In Fig. 4 there is illustrated still another embodiment of material which is more efficient and slightly more expensive than that shown in Fig. 3. Like the embodiment of Fig. 3, the material shown in Fig. 4 includes a structural member 41 and a layer 42 of insulating material beneath it, which is preferably of felt or the like. In this instance, however, another layer 43 of insulating material of the same or a different kind, is also employed above the structural member 41, and the weather-resisting waterproof facing 44 is placed on top of the layer 43. Blind fastening means 45 is preferably built into the material, as before, and may be used to attach it to the ribs or frame members 46.

The additional layer of insulating material 43 above the structural member 41 increases both the acoustical and thermal insulating efficiencies of the construction and results in an extremely high-class and satisfactory product suitable for use on the most expensive automobiles.

Other things being equal, there is some increase in efficiency if the layer 43 is different from the layer 42 in the various characteristics above mentioned. For example, one layer may be of paper felt while the other is of wool felt, or one may be of felt and the other of some soft sound-absorbent material other than felt.

As previously stated, the material is not limited in its usefulness to automobile tops, but has been described in this connection, since it is especially adapted for that purpose. The embodiments shown in Figs. 3 and 4 could also be used, for example, as a linoleum underlay for floors, being turned upside down so that the felt layers 32 or 42 were uppermost. Linoleum or other floor covering may then be cemented to this building material, the felt layers 32 or 42 serving to absorb the moisture from the paste or cement used in attaching the linoleum, while the structural members 31 or 41 are sufficiently strong and rigid so that they bridge any crevices or slight depressions in the floor and provide a substantial base on which the linoleum may rest. The moisture resistant layers 33 or 44 prevent entrance of moisture into the material from below, which is especially important where linoleum is laid in cellars or the like, since the moisture might otherwise seep up to an extent sufficient to deteriorate the cement used to hold the linoleum to the underlay.

The present building materials obviously may be used also as sheathing, siding, or the like.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. Construction material for automobile tops and the like, comprising, as one ply, a closely matted, porous, relatively tough, separately formed fibrous panel having a substantial degree of sound deadening and having sufficient strength, toughness, rigidity, and resilience to be capable of being bent to and of maintaining permanently without cracking a smooth doubly curved shape such as that of an automobile top and to be capable of carrying substantial loads between spaced supports, and a second facing ply separately formed and permanently secured to said first ply throughout substantially the entire common area of the two plies, said second facing ply being of weather resisting sheet material treated to render it substantially impervious to water and being readily flexible in normal cold condition and sufficiently thick to mask surface irregularities of said fibrous panel.

2. Construction material for automobile tops and the like, comprising, as one ply, a closely matted, porous, relatively tough, separately formed fibrous panel having a substantial degree of sound deadening and having sufficient strength, toughness, rigidity, and resilience to be capable of being bent to and of maintaining permanently without cracking a smooth doubly curved shape such as that of an automobile top and to be capable of carrying substantial loads between spaced supports, and a second facing ply separately formed and permanently secured to said first ply throughout substantially the entire common area of the two plies, said second facing ply being of weather resisting sheet material treated to render it substantially impervious to water and being readily flexible in normal cold condition and sufficiently thick to mask surface irregularities of said fibrous panel and having an exposed face capable of receiving and retaining a finish coating of paint, enamel, lacquer, or the like.

3. Composite laminated construction material for automobile tops and the like, comprising, as one ply, a relatively tough, separately formed fibrous panel of substantial area having sufficient strength, toughness, rigidity, and resilience to be capable of being bent to and of maintaining permanently without cracking a smooth doubly curved shape such as that of an automobile top and to be capable of carrying substantial loads between spaced supports, a second separately formed ply having an area substantially coextensive with that of said first ply and firmly and permanently bonded to said first ply throughout substantially the entire common area of the two plies so that the two plies flex as a unit, said second ply being of unsaturated and substantially unimpregnated felt-like material substantially softer and more flexible than said first ply and having a substantial degree of sound deadening, and a third separately formed facing ply having an area substantially coextensive with that of said first two plies and permanently secured to one side of one of said first two plies throughout substantially the entire common area of said third ply and said first two plies, said third facing ply being of weather resisting sheet material treated to render it substantially impervious to water and being readily flexible in normal cold condition.

4. Construction material for automobile tops and the like, comprising, as one ply, a panel of substantial area having sufficient strength, rigidity, and resilience to be capable of being bent to and of maintaining permanently without cracking a smooth curvature in two directions such as the double curvature of an automobile top, a second facing ply separately formed and permanently secured to one side of said first ply, said second ply being of material substantially impervious to water and including a substance which may exude from said ply, and a substantially continuous coating on the outer surface of said second ply, said coating being substantially impervious to said substance, so as to prevent said substance from "bleeding" or exuding from said second ply.

5. Composite construction material especially adapted for use in automobile tops and the like, comprising a relatively strong structural member, a waterproof facing, a layer of sound deadening material between said structural member and said facing, and a second layer of sound deadening material on the opposite side of said structural member from said facing.

6. Composite construction material comprising a relatively strong and rigid fiber board forming a structural member, a waterproof facing, a layer of felt between said structural member and said facing, and a second layer of felt on the opposite side of said structural member from said facing.

7. A unitary ready-to-apply panel for automobile tops and the like, comprising a relatively strong layer of fiber board forming a structural member, a waterproof layer distinct from but permanently associated with said fiber board, and a layer of relatively soft sound deadening material also permanently associated with said fiber board and firmly bonded thereto throughout a substantial area to flex therewith and thus to dissipate the energy of vibrations set up in said fiber board.

8. Construction material for automobile tops and the like, comprising a relatively strong structural member, a layer of felt paper impregnated with waterproofing material on one side of said structural member and permanently secured thereto, and a non-bleeding coating on the outer surface of said felt paper.

9. Construction material for automobile tops and the like, comprising a relatively strong structural member, a layer of felt paper impregnated with waterproofing material on one side of said structural member and permanently secured thereto, and a coating on the outer surface of said felt paper impervious to the waterproofing material with which said felt paper is impregnated, to prevent said waterproofing material from "bleeding" from said felt paper.

10. Material according to claim 9, in which said structural member is formed of a relatively thick sheet of homogeneous and porous fiber board.

11. Construction material for automobile tops and the like, comprising a relatively strong structural member having a naturally rough surface, a layer of felt paper impregnated with waterproofing material on one side of said structural member, and a sheet of material substantially smoother than said rough surface on the opposite side of said structural member.

12. A preformed material ready for application to automobile tops and the like, comprising, as one ply, a closely matted, porous fibrous panel having sound deadening properties and forming a structural member which is sufficiently elastic to permit springing to the double curvatures of automobile tops and the like, but which is relatively strong and rigid so as to maintain permanently a smooth, continuous curvature in both directions when so sprung over spaced supports, and a second facing ply of separately formed, relatively tough weather-resisting sheet material treated to render it substantially impervious to water, said second facing ply being readily flexible in normal cold condition, and being bonded to said first ply throughout substantially the entire common areas of the two plies, and said second ply having an exposed face capable of receiving and retaining a finish coating of paint, lacquer, or the like.

13. A composite construction material comprising a relatively strong and rigid structural member of fiber board, for imparting substantial strength to the composite material, and a layer of softer relatively porous unsaturated sound absorbent material on each side of said structural member to impart substantial sound damping qualities to the composite material.

14. A composite construction material comprising a relatively strong and rigid structural member of relatively hard, dense, non-porous material, for imparting substantial strength to the composite material, and a layer of softer sound absorbent material on each side of said structural member to impart substantial sound damping qualities to the composite material, at least one of said layers of softer material being a layer of felt paper.

15. A composite construction material comprising a relatively strong and rigid structural member for imparting substantial strength to the composite material, a layer of softer sound absorbent material on each side of said structural member to impart substantial sound damping qualities to the composite material, and a layer of textile fabric overlying at least one of said layers of softer sound absorbent material.

CHARLES A. UPSON.